May 20, 1958     B. WHITEFIELD     2,835,589
PROCESSING AND MEANS FOR CARAMELIZING CARAMEL, TOFFEE
AND SIMILAR SUBSTANCES
Filed Nov. 22, 1955     3 Sheets-Sheet 3

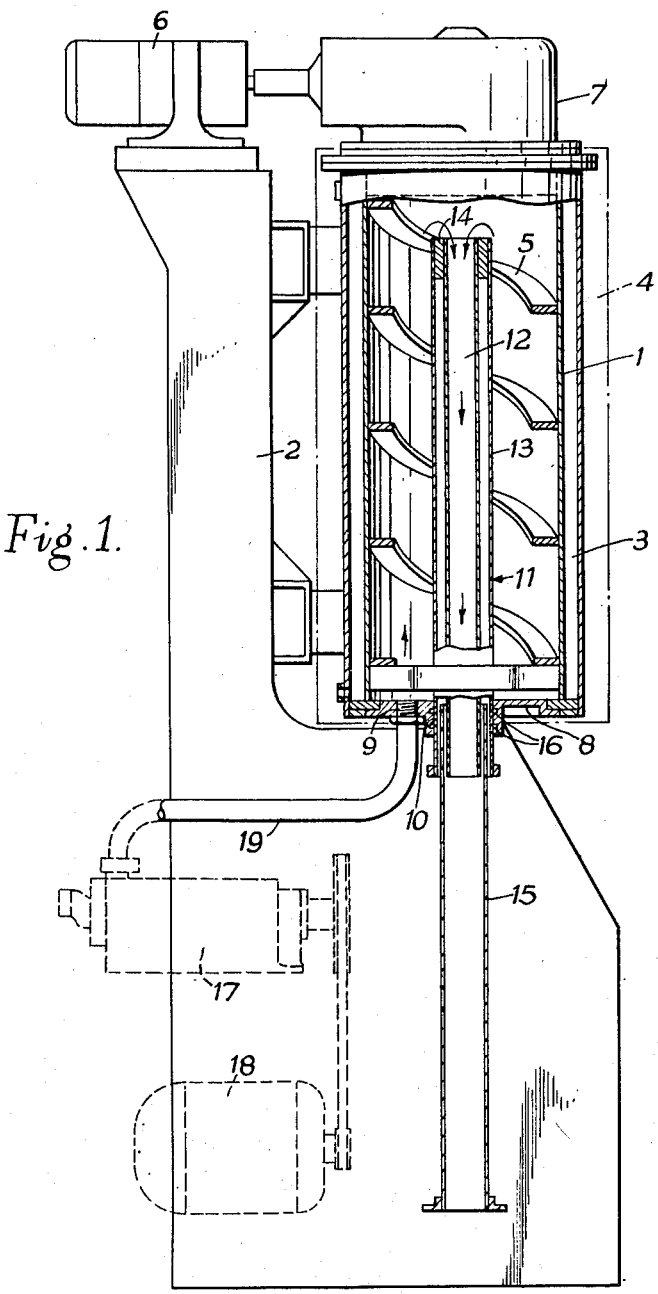

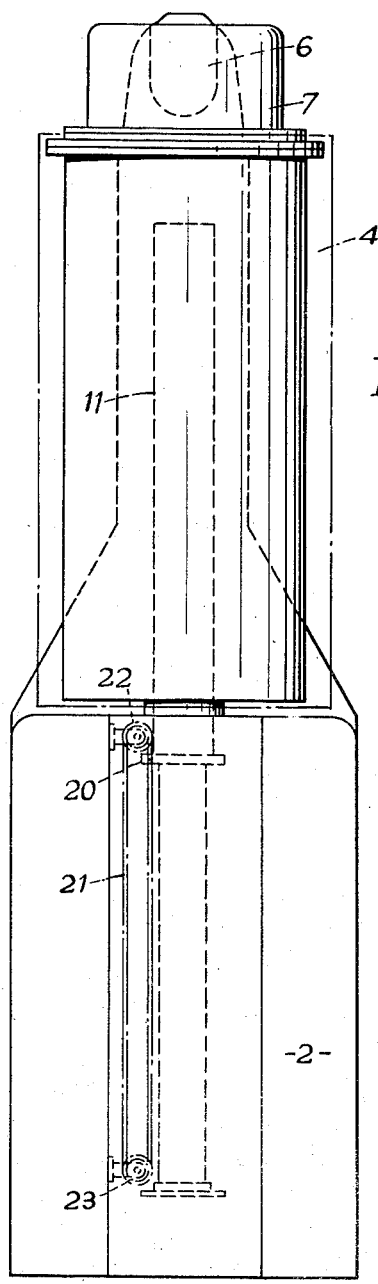
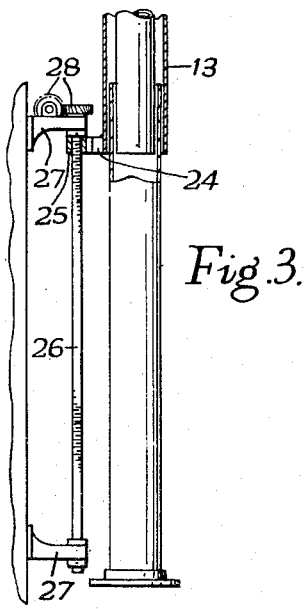

INVENTOR
Bernard Whitefield
BY
Michael S. Striker
Agent

United States Patent Office 2,835,589
Patented May 20, 1958

2,835,589

PROCESSING AND MEANS FOR CARAMELIZING CARAMEL, TOFFEE AND SIMILAR SUBSTANCES

Bernard Whitefield, Cuffley, England

Application November 22, 1955, Serial No. 548,471

Claims priority, application Great Britain November 23, 1954

15 Claims. (Cl. 99—134)

The present invention relates to a process and means for caramelizing caramel, toffee and similar substances and has for its object to provide a process and means whereby the caramelizing or flavor development can be controlled to a very fine degree so as to obtain the best results with substances having different characteristics and slightly different ingredients.

The making of toffee usually involves three preliminary stages with which the present invention is not concerned and a fourth stage with which the invention is concerned.

The three known stages consist firstly in roughly mixing together ingredients such as fats, sugar, glucose and condensed milk which are mixed in a steam jacket mixer and then fed by gravity to the second stage which comprises a homogenizer or disintegrator having a constant rate of discharge. Alternatively, the substances at the first stage may be pumped at a continuous rate into a double worm type continuous mixer or may be dissolved in water to form a solution.

The homogenizer or disintegrator used at the second stage has a constant rate of discharge and breaks up the granules of sugar and makes an emulsion in the case of a mix and in the case of a solution makes an emulsion of the materials.

At the third stage the substance is transferred directly into a cooking chamber, of which there are various kinds, and is boiled to a predetermined temperature continuously. These three stages may also be carried out in batch form in the heated mixing vessel. The fourth stage and the one with which the present invention is concerned is that at which caramelizing or flavor development takes place.

According to one aspect of the present invention there is provided a method of making caramel, toffee and similar substances wherein, after known preliminary steps or stages such as roughly mixing the ingredients, homogenizing or disintegrating the roughly mixed ingredients, and then cooking the mixed and disintegrated substance, the substance is discharged in a continuous flow to apparatus for caramelizing or developing the flavor of the substance and which apparatus is so constructed that the length of time the substance remains in the apparatus can be varied without interfering with the rate of flow of the substance therethrough. The caramelizing apparatus is of course heated or heat insulated so as to maintain the substance at a constant desired temperature.

According to another aspect of the invention there is provided a method of caramelizing toffee and like substances which consists in causing the mixed and prepared substance to be stirred and displaced progressively and continuously through a caramelizing chamber at a constant rate and arranging that the substance is discharged from the chamber after it has been fed therethrough a predetermined distance.

Apparatus for carrying out the method of this invention broadly comprises a chamber having an inlet through which the pretreated substance is fed, means for feeding said substance progressively and at a constant rate through the chamber, and means for discharging the substance after it has remained in said chamber a required time and has been displaced therethrough a predetermined space or distance.

According to one form of the apparatus said chamber is provided with an adjustable outlet through which the substance is discharged after it has been fed a predetermined distance through the chamber at a constant rate. Preferably, the caramelizing chamber is a cylinder having its axis disposed vertically with the inlet at the lower end thereof, and the adjustable outlet comprises a tube which is vertically slidable within the cylinder, the inner end of said tube being open so that according to the setting of the tube the substance in the cylinder can be caused to discharge through said tube at any desired level after it has been fed progressively up the cylinder.

According to another form of the apparatus said chamber is provided with a plurality of outlets fitted with closure members or valves so that a required outlet can be brought into use to effect discharge of the substance after the latter has been in the chamber a desired time and has been fed therethrough a predetermined distance.

According to a third embodiment the caramelizing apparatus comprises a heater or heat insulated jacket to which the pretreated substance is conducted straight from the cooking stage and this jacket accommodates a power driven stirrer, a worm or screw which feeds the substance through the jacket from one end to the other to an outlet and the said scraper worm or screw together with a closure wall fitted with said outlet, is adjustable longitudinally relatively to the jacket to vary the volume thereof. A similar result would of course be obtained by moving the jacket lengthways relatively to the scraper worm or screw but this may not always be practicable.

By means of the above apparatus it will be appreciated that the rate of flow of substance will remain constant at all times irrespective of the time it takes to pass through the caramelizing apparatus.

To enable the invention to be clearly understood three embodiments thereof will now be described by way of example with reference to the accompanying drawings, therein:

Figure 1 is a vertical section illustrating one embodiment.

Figure 2 is a front elevation of Figure 1.

Figure 3 is a fragmentary view showing alternative means for raising and lowering the discharge tube.

Figure 4:
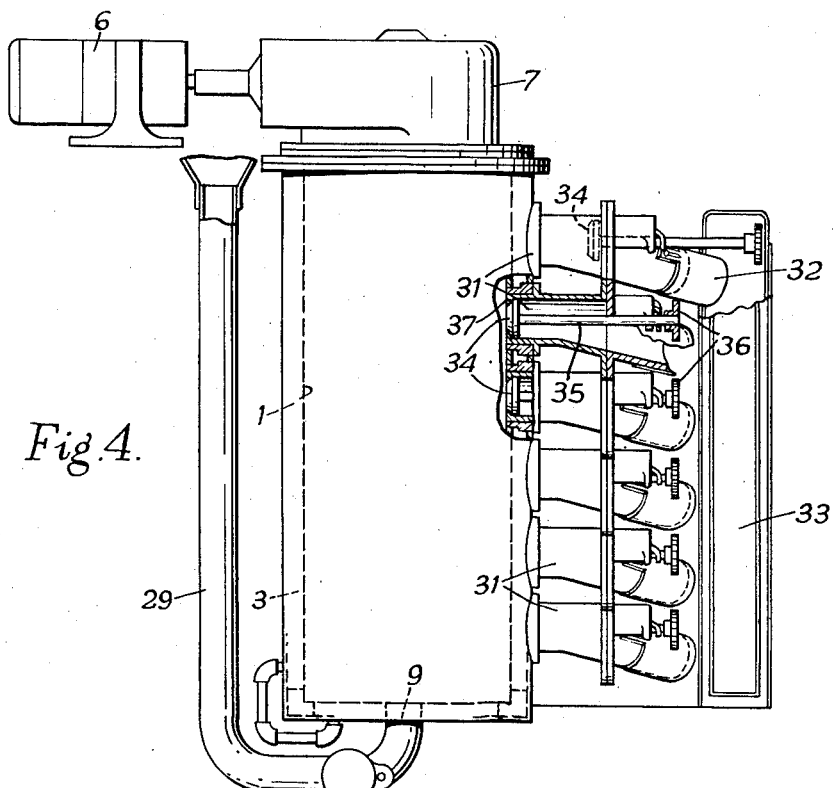
Figure 4 is a part sectional view of a second embodiment.

Referring firstly to Figures 1 and 2, the caramelizing chamber comprises a cylinder 1 supported by a main frame 2. Preferably, the cylinder 1 is enclosed in a steam jacket 3 for maintaining the substance in the cylinder 1 at a required temperature and this jacket 3 is enclosed in heat insulating material 4.

The cylinder 1 is fitted internally with a rotor or wormlike stirrer 5 driven by an electric motor 6 through a reduction gear box 7 mounted above the cylinder 1.

The bottom of the cylinder 1 is closed by a cover 8 formed with an aperture 9 providing an inlet for the substance and a second aperture 10 co-axial with the cylinder 1 through which can slide an adjustable outlet tube indicated generally at 11.

In the embodiment being described this tube 11 comprises inner and outer co-axial sleeves 12 and 13 which are spaced apart at their upper ends by a spacing ring 14, the annular space between the tubes 12 and 13 sliding over a fixed delivery pipe 15 when the tube 11 is adjusted vertically to bring its upper open end at a required level in the cylinder 1. Such an arrangement prevents the tube 11 moving laterally during its vertical displacement. Any suitable form of packing means 16 may be provided for preventing leakage between the outer sleeve 13 and the cover 8.

The substance to be caramelized passes from a cooker (not shown) to a pump 17 driven by an electric motor 18 and passes through a conduit 19 leading to the inlet 9 through which the substance is supplied to the cylinder 1 through the opening 9 in the cover 8.

It will be appreciated that by raising or lowering the discharge tube 11 the substance passing through the cylinder 1 can be caused to be discharged from the cylinder when it reaches a level at which it will flow into the upper open end of the discharge tube 11. In this manner the time during which the substance remains in the caramelizing cylinder 1 can be varied without interfering with the rate of flow of the substance. Also, the substance is caused to travel progressively and upwardly through the cylinder for a predetermined distance so as to be acted upon and stirred by the rotor 5.

Figures 2 and 3 illustrate two ways in which the tube 11 can be raised or lowered to position its upper end at a required level in the cylinder 1.

Referring firstly to Figure 2, the outer sleeve 13 is fitted with a lateral projection 20 secured to one of the links of an endless chain 21 passing around sprocket wheels 22 and 23. A hand wheel (not shown) is provided for turning one of the sprocket wheels through a pawl and ratchet arrangement, the pawl being manually displaceable to permit lowering of the tube.

Referring next to Figure 3, the outer tube 13 is provided with an abutment 24 incorporating a screwed collar 25 engaging a threaded shaft 26 journalled in brackets 27 carried by the main frame 2. The shaft 26 may be driven through a worm and worm wheel drive 28 either by hand or by a variable speed electric motor.

It will be appreciated that at the end of a production run when substance ceases to be fed through the inlet 9 to the lower end of the cylinder 1 that it will be necessary to arrange for discharge of the substance in the cylinder which will no longer flow into the upper end of the outlet tube 11. This is achieved, when the tube is adjustable by motor mechanism illustrated in Figure 3 by selecting the motor speed so that it will drive the tube 11 downwards at a speed at which the substance ascended through the cylinder. Thus, for example, if the plant was producing one thousand five hundred pounds of caramel per hour at ten minutes caramelization, the electric motor would be started to lower the tube 11 in ten minutes as soon as the feed to the caramelizer is stopped. With this arrangement substance at the top and which has been in the cylinder for ten minutes will be discharged immediately and the lowermost level, which has just entered the cylinder will be discharged after ten minutes when the top of the tube 11 has reached the bottom of the cylinder 1. In this way the output of the plant is uniformly treated virtually to the last drop of substance. During normal running of the plant the tube 11 of course remains in its set adjusted position. Instead of making the tube 11 of two sleeves, the tube can be a single sleeve which is simply slidable through the bottom cover 8 and in this case the guide tube 15 will be omitted.

Referring next to Figure 4 of the drawings, the embodiment, illustrated by this figure, shows alternative feed and discharging means and parts of the apparatus illustrated by this figure which are common to those illustrated in Figures 1 to 3 have been allocated the same reference numerals.

Assuming the cooker (not shown) is situated at a higher level than it is in the embodiment illustrated in Figures 1 to 3, the material may be fed by gravity through a conduit 29 into the lower end of the cylinder 1 by way of the inlet 9. A drain valve 30 is provided in the lowermost portion of the conduit 29 to facilitate emptying and cleaning of the apparatus. In this figure, the rotor or stirrer has been omitted for clarity as have also the steam inlet and outlet to the steam jacket 3.

Figure 5:
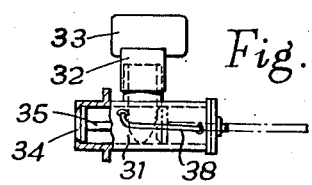
Figure 5 is a detail view showing alternative means for operating the valves illustrated in Figure 4

The cylinder 1 in this embodiment is fitted with a number of outlets 31 arranged at different levels and these outlets terminate in spouts or slidable extensions 32 leading to a common collecting duct 33 from which the substance can pass to a depositor or cooling table (not shown). Each outlet 31 may be closed by a valve 34 having a stem 35 which projects through the casing of the outlet and provided with a knurled turning handle 36, the turning of the handle 36 acting to rotate and move the valve 34 axially towards or away from its seating 37. In the Figure 4 it will be seen that the uppermost valve 34 has been moved to its open position. Means is preferably provided for locking and maintaining each valve in its closed position. With an alternative arrangement, as illustrated in Figure 5, the substance flows into the outlet 31 down a well and then laterally through a spout 32 into a common duct 33. In this case the valve stem 35 carries a radial pin which extends through a slot 38 in the outlet casing 31.

In both the arrangements illustrated by Figures 4 and 5 the outlets are designed to prevent caramel coming into contact with the valve stems since this might cause seizure of the stems and lead to difficulty in cleaning the apparatus.

The provision of a series of outlets 31 at different levels gives only a step by step regulation of caramelization for any given output. Additional regulation can, if desired, be obtained by variation of temperature achieved by changing the steam pressure in the jacket 3.

By using the multiple outlet arrangement illustrated by Figure 4 infinite variation of caramelization can be obtained either by (a) change of capacity of the chamber plus a change of rate of flow of the substance or (b) by change of capacity of the chamber and of the temperature whilst maintaining a constant rate of flow.

Figure 6:
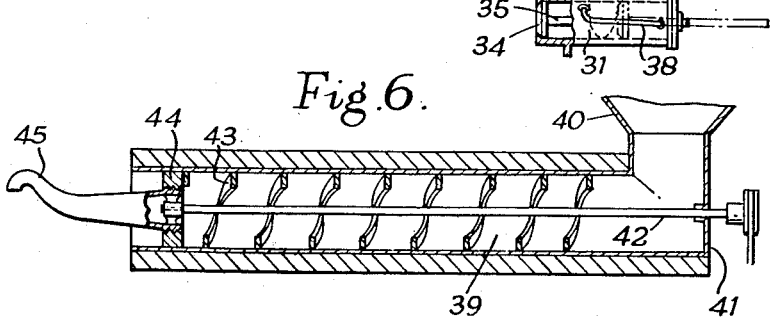
Figure 6 is a diagrammatic view illustrating a third embodiment.

Referring lastly to Figure 6, the boiled material is discharged from the cooking apparatus in a continuous flow into the caramelizing jacket or chamber 39 which may be heated or have heat insulating walls. The substance is discharged into said jacket 39 through a feed hopper 40, a part of which can constitute one end wall 41 of the jacket 39 and the shaft or rod 42 of the scraper worm or screw 43 is slidable axially through this end wall 41 of the hopper and is driven externally of the hopper in any suitable manner. The other end of the shaft or rod 42 is connected to an end wall 44 closing the other end of the jacket and this end wall 44 is slidable longitudinally in the jacket 39 so that it can be moved bodily with the scraper worm or screw 43 to vary the volume of the jacket. Thus, the substance, when the volume of the jacket is decreased, passes at a constant rate through the jacket for a short time only or can be caused to pass through a jacket of increased volume at the same rate of flow but for a longer time.

Further means for varying the rate of speed through the jacket may be provided by the provision of a flexible outlet spout 45 in the end wall 44, or alternatively the end wall 44 may be rotatable about its axis through an arc of 90°, the outlet spout 45 in this particular instance being rigid, to vary the outlet to permit discharge at certain levels.

By this means there is provided the possibility of rotating the outlet end wall so that the height of the material in the horizontal chamber could be varied from full to half. A modification of this last embodiment consists on making the rigid curved outlet pipe 45 rotatable independently of the end wall 44 and positioning its feed end at the bottom of the end wall. Alternatively, positioned again at the bottom of the end wall, could be the flexible pipe the delivery end of which could be set up or down to give any height of material in the horizontal chamber from full to empty. Both the above arrangements would not only enable the normal running level of the material in the chamber to be regulated and thus the capacity of the device, but would also enable the horizontal chamber (see Fig. 6) to be emptied gradually.

In all embodiments, flavor and additives such as nuts and fruit may be incorporated in the continuous flow of the substance to the caramelizer.

By means of the present invention it will be seen that flavoring or caramelizing can be carried out in a positive predetermined and precise manner because the adjustment as to the effective volume of the caramelizing chamber is almost infinitely variable.

The entire process comprising the three known stages and the improved process at the fourth stage which is provided by this invention can be carried out so that a continuous flow of the substance from one stage to another takes place.

According to another embodiment (not illustrated) the apparatus consists of a cylindrical vessel with vertical axis and composed of several annular jacketed sections superimposed upon one another. The arrangement of steam inlet and outlet connections is such that heat may be applied only where necessary; that is to say the whole vessel may be actively engaged in the caramelization of the product or a portion may be put out of action by closing the appropriate steam inlet and outlet valves. In this way the material may receive more or less caramelizing whilst taking the same time to pass through the chamber for a given rate per hour.

What I claim is:

1. A method of maintaining substantially constant the time during which the last of a substance which is fed along a treating path of predetermined length at a substantially constant rate is treated after the feeding of the substance is terminated, comprising the step of shortening said path, when the feeding of the substance has terminated, at a rate substantially equal to that at which the substance was fed prior to termination of feeding, whereby the total treating time of each part of the substance is substantially the same.

2. A method of maintaining substantially constant the time during which the last of a flowable substance which is introduced through a bottom inlet of a treating vessel at a substantially constant rate is treated after the feeding of the substance is terminated, comprising the step of removing the substance at the upper surface thereof, as said upper surface in said treating vessel drops, at substantially the same constant rate, whereby the total treating time of each part of the substance is substantially the same.

3. A method of maintaining substantially constant the time during which the last of a liquid which is introduced through a bottom inlet of a treating vessel at a substantially constant rate is treated after the feeding of the liquid is terminated, comprising the step of removing the liquid at its upper surface, as the liquid level drops in said treating vessel, at substantially the same constant rate, whereby the total treating time of each part of the liquid is substantially the same.

4. A method of maintaining substantially constant the time during which a substance is treated in a treating vessel, comprising the steps of continuously introducing the substance at the bottom of the vessel at a substantially constant rate and simultaneously removing the liquid through outlet means located at a level higher than said bottom of said vessel; discontinuing the introduction of the substance into said vessel; and lowering the effective portion of said outlet means at such a rate that the substance flows out through said outlet means at substantially said constant rate, whereby the total treating time of each part of the substance is substantially the same.

5. In a treating apparatus, in combination, receptacle means having an inlet through which a substance may be introduced into said receptacle means; and variable outlet means operatively associated with said receptacle means for providing an outlet for the substance at different points spaced different distances from said inlet, whereby the total time which a substance introduced into said receptacle means through said inlet thereof may, after introduction of the substance has been terminated, be controlled by varying the location of said outlet means relative to said inlet means.

6. In a treating apparatus, in combination, upright receptacle means having a bottom inlet through which a substance may be introduced into said receptacle means; and variable over-flow outlet means operatively associated with said receptacle means for providing an outlet for the substance at different heights above said bottom inlet, whereby the total time which a substance introduced into said receptacle means through said bottom inlet thereof may, after introduction of the substance at a constant rate has been terminated, be controlled by varying the height of said overflow outlet means relative to said bottom inlet.

7. In a treating apparatus, in combination, upright receptacle means having a bottom inlet through which a substance may be introduced into said receptacle means; and variable over-flow outlet means operatively associated with said receptacle means for providing an outlet for the substance at different heights above said bottom inlet, said variable over-flow outlet means including overflow conduit means arranged in said vessel and mounted for movement relative thereto between different positions wherein one end of said conduit means is located different heights above said bottom inlet of said vessel, whereby the total time which a substance introduced into said receptacle means through said bottom inlet thereof may, after introduction of the substance at a constant rate has been terminated, be controlled by varying the height of said over-flow outlet means relative to said bottom inlet.

8. In a treating apparatus, in combination, upright receptacle means having a bottom inlet through which a substance may be introduced into said receptacle means; and variable over-flow outlet means operatively associated with said receptacle means for providing an outlet for the substance at different heights above said bottom inlet, said variable over-flow outlet means including overflow conduit means arranged in said vessel and mounted for movement relative thereto between different positions wherein one end of said conduit means is located different heights above said bottom inlet of said vessel and moving means operatively associated with said conduit means for automatically moving the same, whereby the total time which a substance introduced into said receptacle means through said bottom inlet thereof may, after introduction of the substance at a constant rate has been terminated, be controlled by varying the height of said over-flow outlet means relative to said bottom inlet.

9. In a treating apparatus, in combination, upright receptacle means having a bottom inlet through which a substance may be introduced into said receptacle means; and variable over-flow outlet means operatively associated with said receptacle means for providing an outlet for the substance at different heights above said bottom inlet, said variable over-flow outlet means including over-flow conduit means arranged in said vessel and mounted for movement relative thereto between different positions wherein one end of said conduit means is located different heights above said bottom inlet of said vessel and moving means operatively associated with said conduit means for automatically lowering the same at such a rate that the substance flows through said one end of said over-flow conduit means at a predetermined rate, whereby the total time which a substance introduced into said receptacle means through said bottom inlet thereof may, after introduction of the substance at a constant rate has been terminated, be maintained constant by so lowering said over-flow conduit means at such a rate that the substance flows out at substantially the same rate at which it flowed into said receptacle means prior to termination of its introduction into said receptacle means.

10. The combination defined in claim 9 wherein said moving means include a variable-speed motor, and motion-transmitting means interconnecting said motor and said overflow conduit means.

11. The combination defined in claim 10 wherein said motion-transmitting means include an endless belt having an upwardly and downwardly moving portion connected to said over-flow means and pulley means for driving said endless belt and connected to said variable-speed motor.

12. The combination defined in claim 10 wherein said motion-transmitting means include a threaded spindle extending in the direction in which said over-flow conduit means extends and threadedly cooperating with said over-flow conduit means for moving the same during rotation of said spindle, and wormscrew drive means interconnecting said spindle and said motor.

13. In a treating apparatus, in combination, upright receptacle means having a bottom inlet through which a substance may be introduced into said receptacle means; and variable over-flow outlet means operatively associated with said receptacle means for providing an outlet for the substance at different heights above said bottom inlet, said outlet means including a plurality of outlet conduits communicating with said receptacle means at different heights above said bottom inlet, respectively, and a plurality of closure means operatively associated with said outlet conduits, respectively, whereby the total time which a substance introduced into said receptacle means through said bottom inlet thereof may, after introduction of the substance at a constant rate has been terminated, be controlled by opening progressively lower conduit means.

14. The combination defined in claim 13 wherein said outlet conduits also communicate with an additional common conduit.

15. The combination defined in claim 14 wherein each outlet conduit is formed intermediate said receptacle means and said additional common duct with a downwardly extending conduit portion, and wherein the closure means of each outlet conduit includes a closure element which is so mounted that when it is in its open position it is exteriorly of the path of the substance flowing from said receptacle means and through said outlet conduit, including said downwardly extending conduit portions thereof, into said additional common conduit.

References Cited in the file of this patent

UNITED STATES PATENTS 2,674,104     Street                 Apr. 6, 1954